Feb. 23, 1954     B. P. VOUMARD ET AL     2,670,012
MEANS FOR WEAVING RIBBONS, TAPES, BANDS, AND THE LIKE
Filed Oct. 30, 1948     9 Sheets-Sheet 2
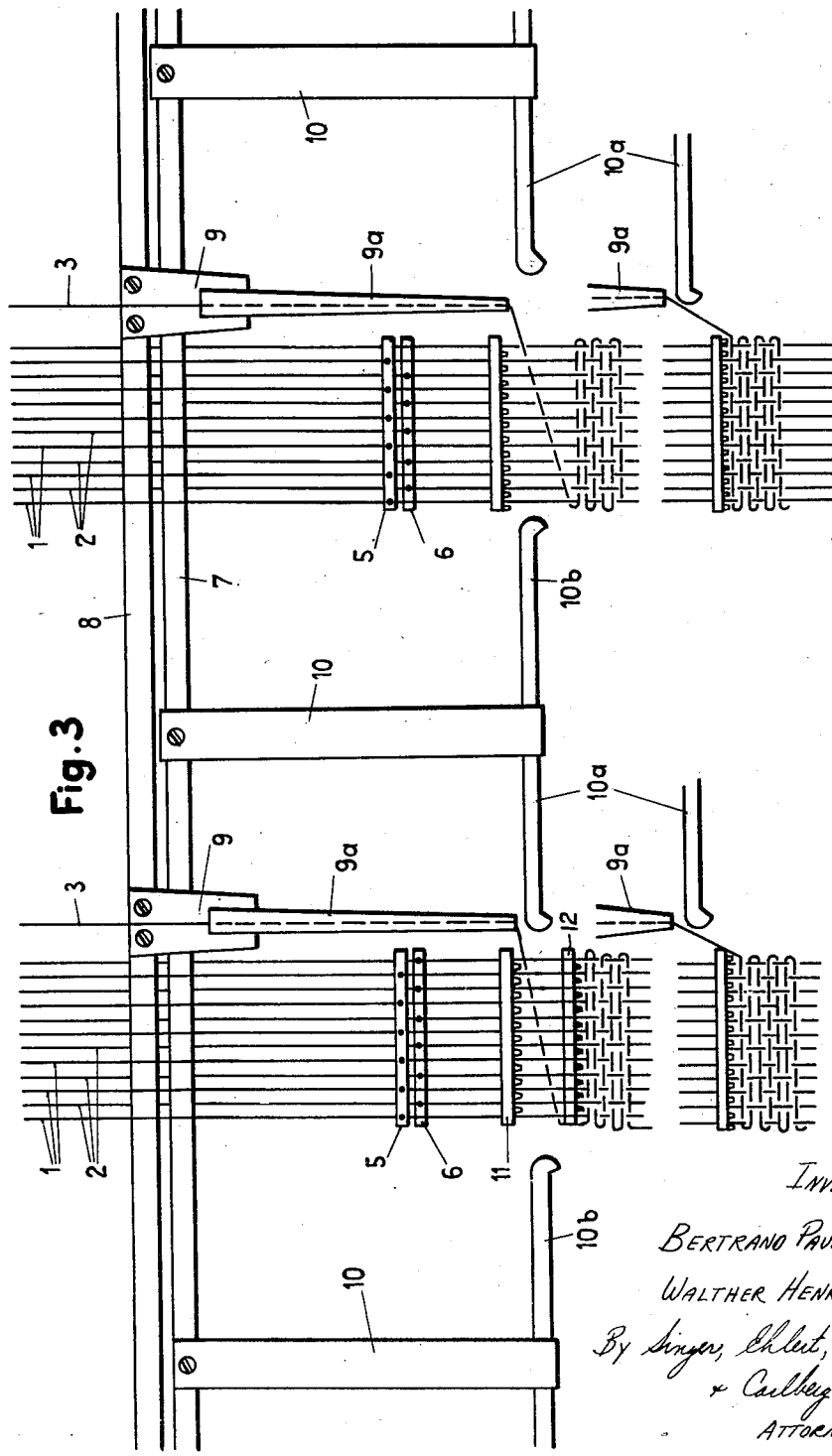
INVENTORS
BERTRAND PAUL VOUMARD
WALTHER HENRI NICOLET
By Singer, Ehlert, Stern
& Carlberg
ATTORNEYS

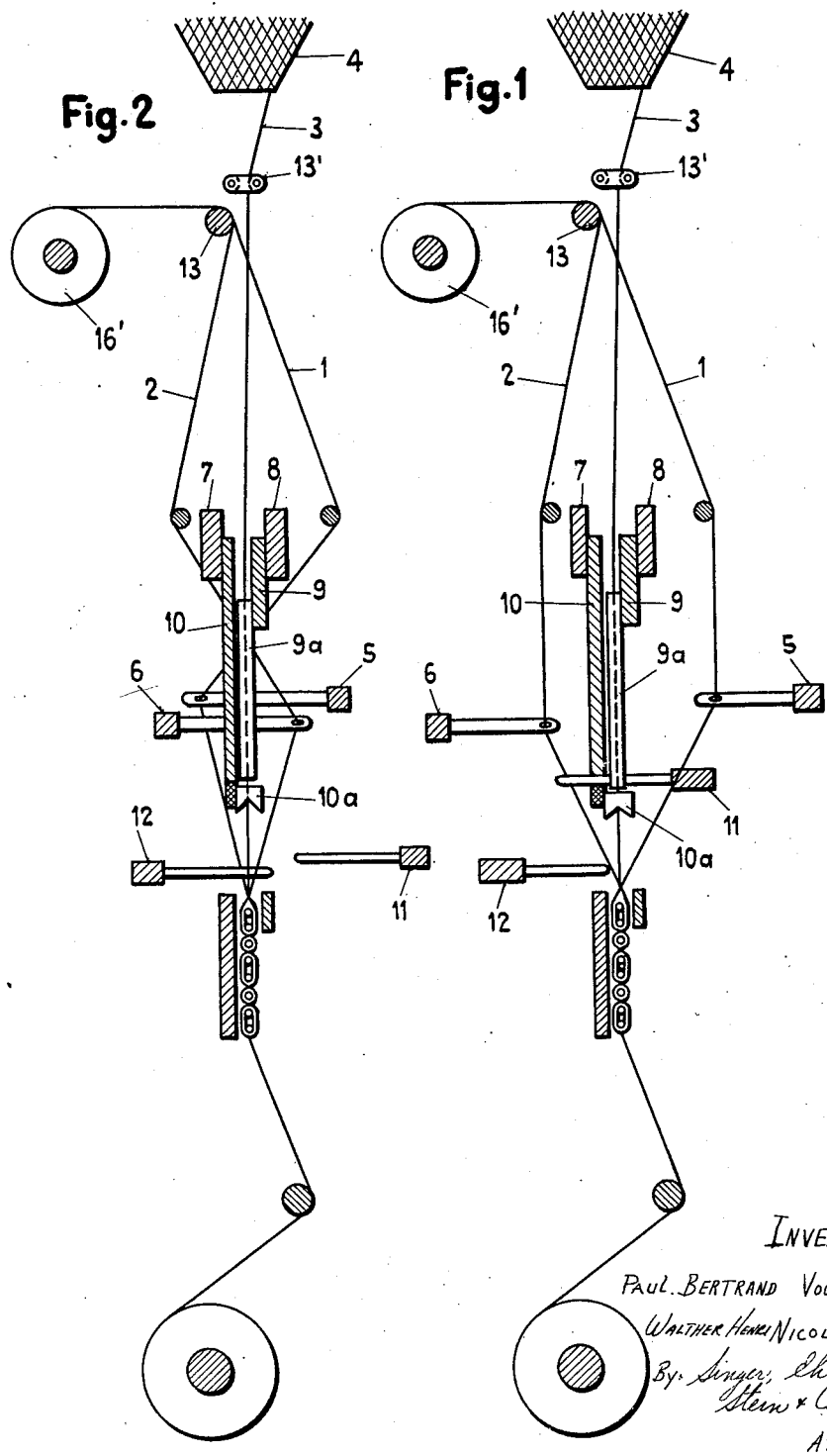

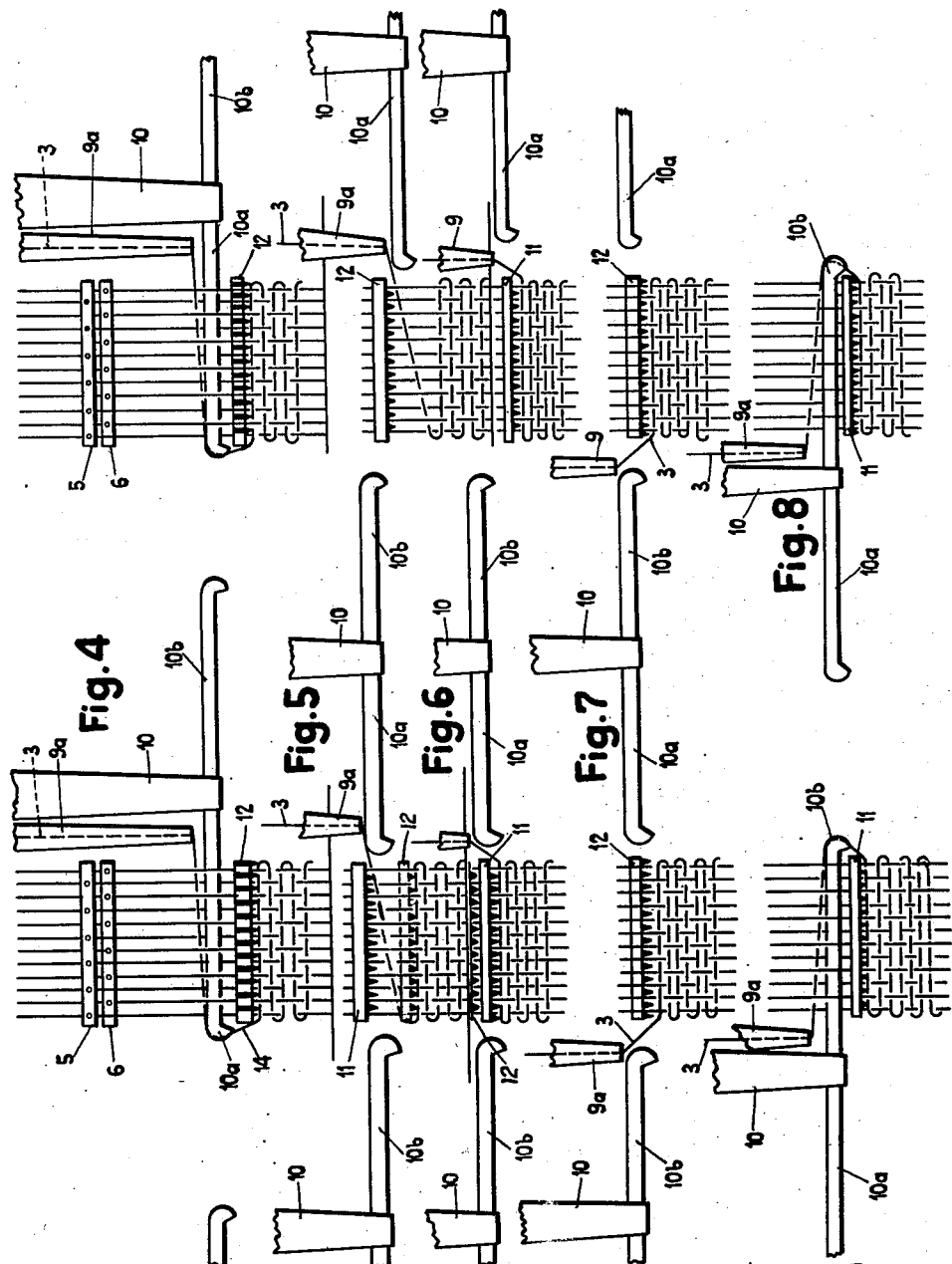

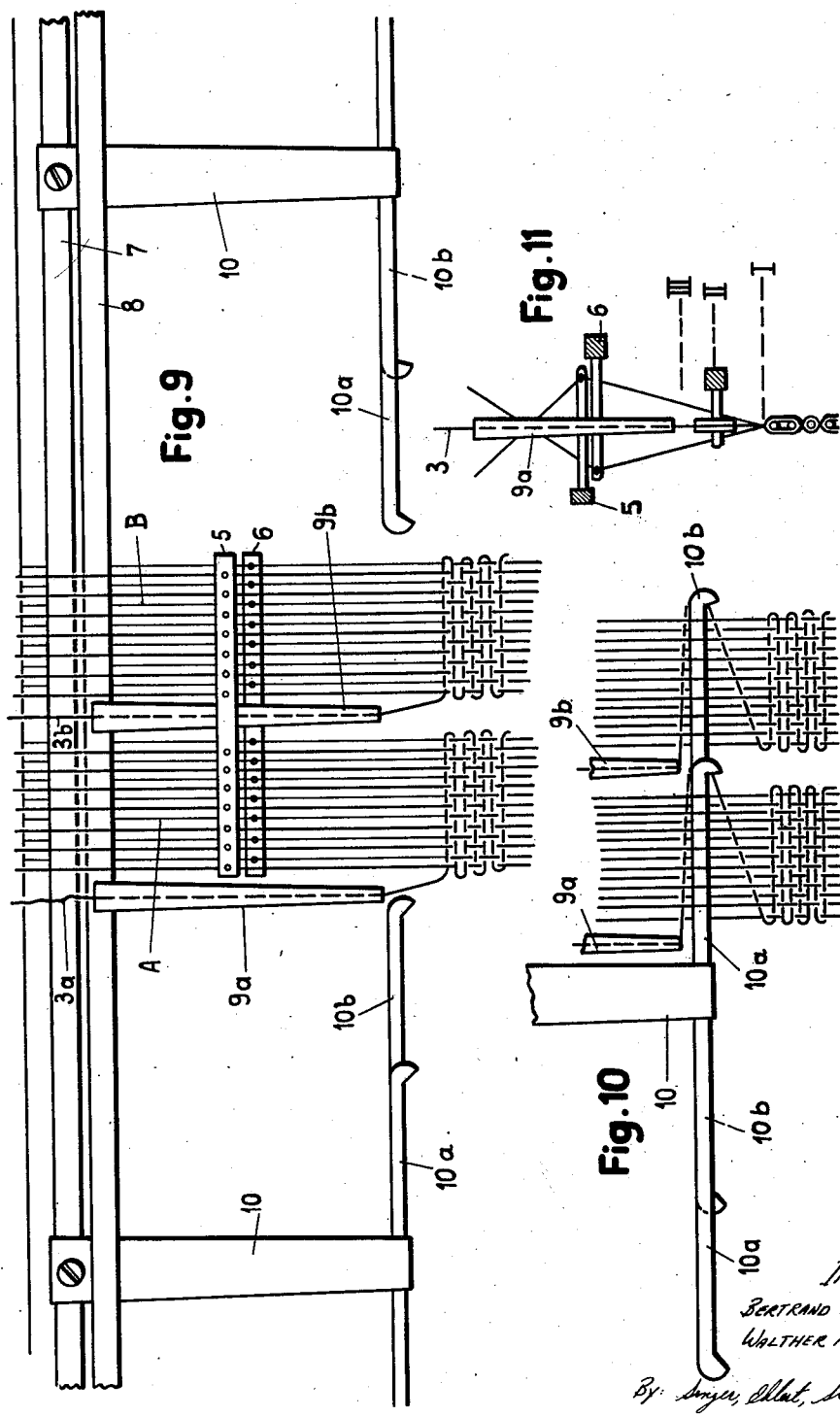

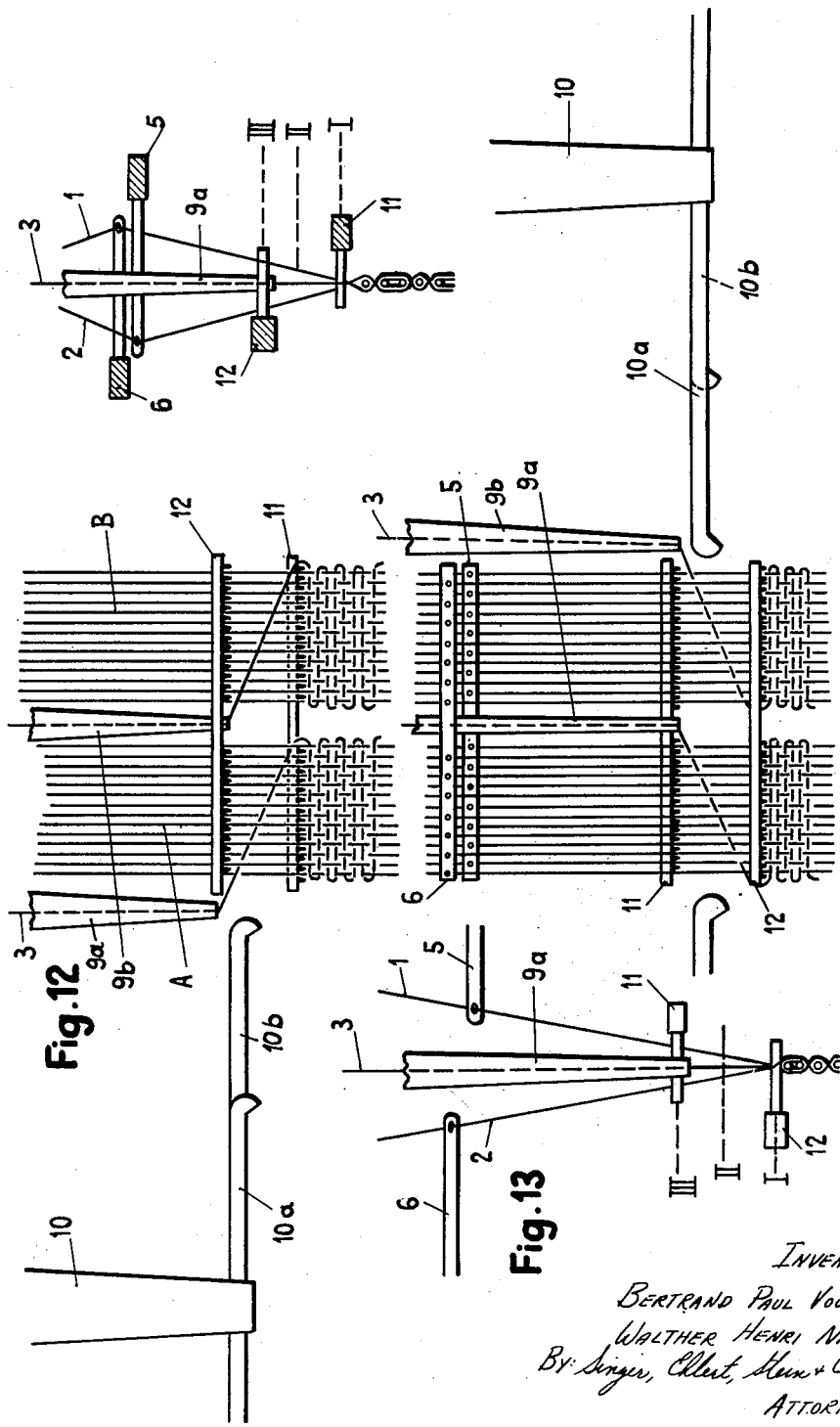

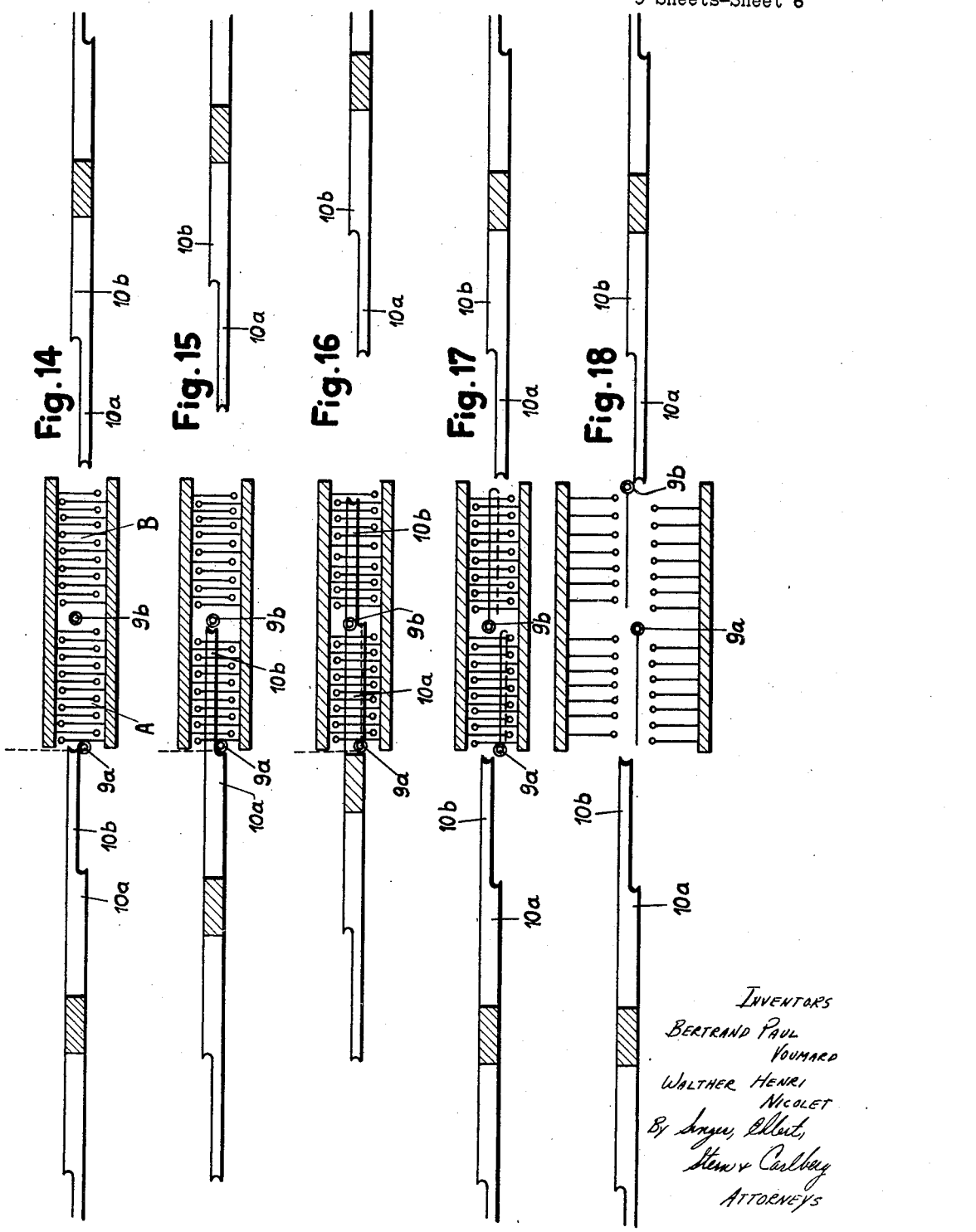

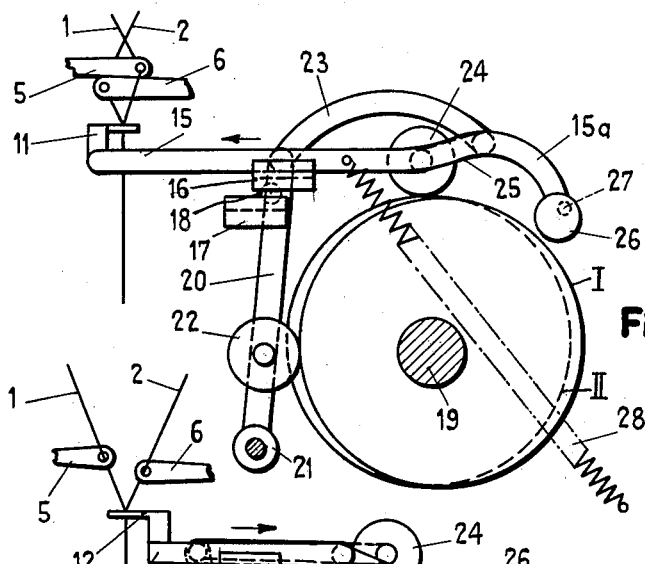
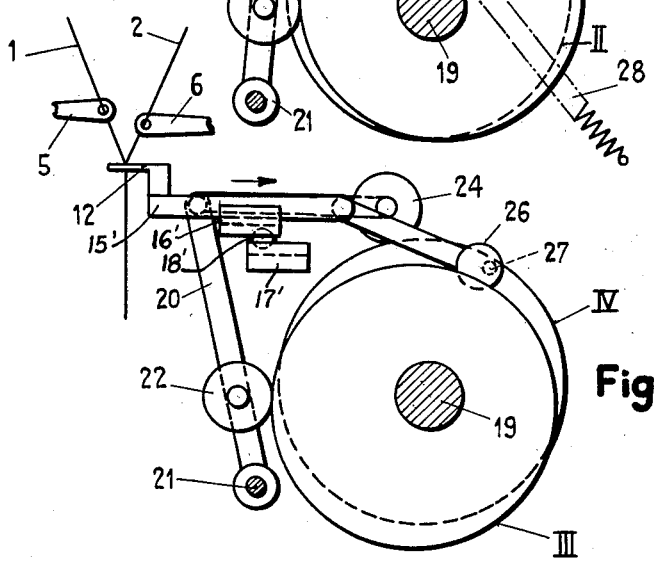
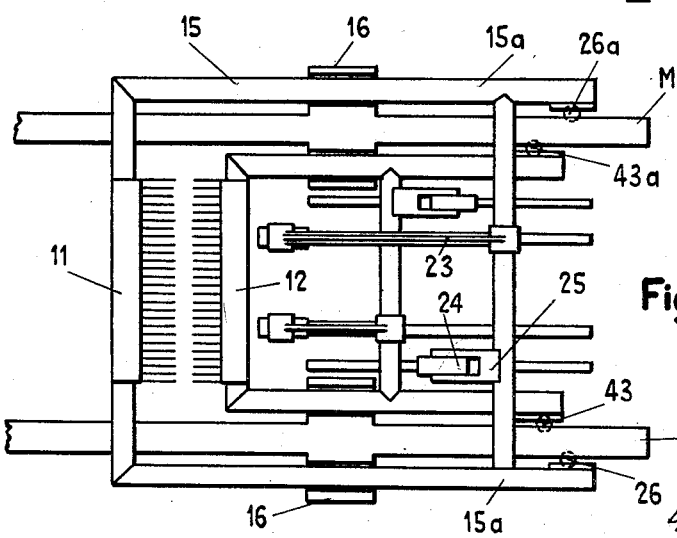

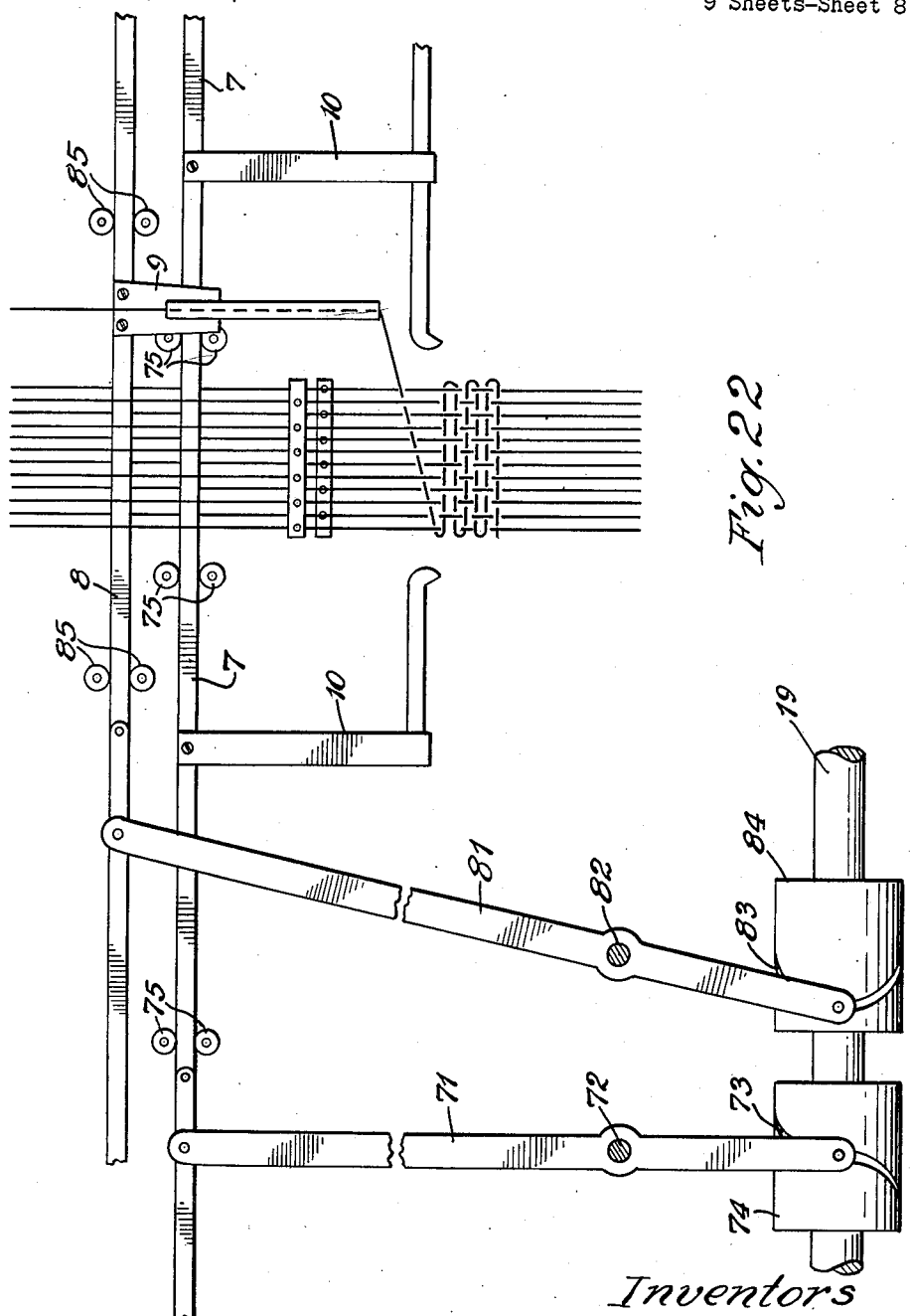

Inventors
Bertrand Paul Voumard
Walther Henri Nicolet
by Singer, Ehlert, Stern & Carlberg
Attorneys Patented Feb. 23, 1954

2,670,012

UNITED STATES PATENT OFFICE 2,670,012

MEANS FOR WEAVING RIBBONS, TAPES, BANDS, AND THE LIKE

Bertrand Paul Voumard and Walther Henri Nicolet, La Chaux-de-Fonds, Switzerland

Application October 30, 1948, Serial No. 57,554

8 Claims. (Cl. 139—11)

The weaving of ribbons and tapes without shuttles, especially of bandages for binding wounds, etc., by means of thread guides as weft inserting means, is known. In order to increase the production of these machines and to utilise the machine elements better, a process has been worked out with which several bands may be woven simultaneously. This process forms the object of the present invention.

In the accompanying drawings two examples of execution of a device according to the invention, for carrying out the method according to the invention, are illustrated diagrammatically, in which:

Figs. 1 and 2 show diagrammatically the device for the weaving, in two different working positions;

Figs. 3–13 illustrate diagrammatically the beating-up device in different working positions;

Figs. 14–18 show diagrammatically the positions of the needles in the various working positions;

Figs. 19–24 show details of the inventive structure.

Figure 23:
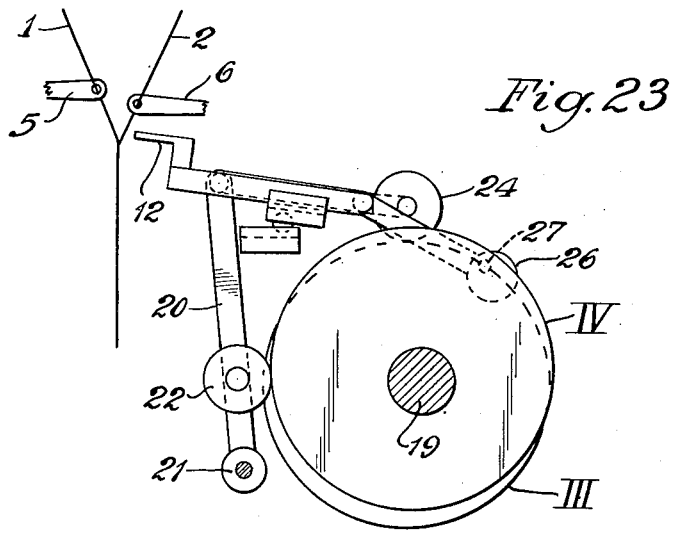

The device shown in the drawing is built for weaving several bands simultaneously.

Figure 24:
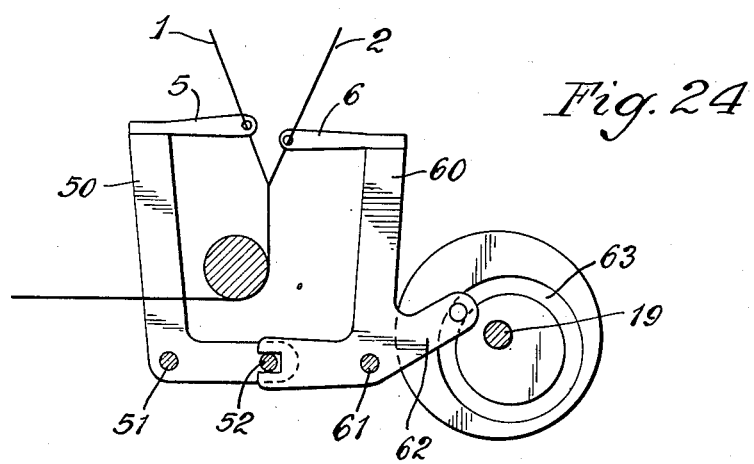

For each weaving position a warp 1, 2 and means 5, 6 for forming the shed are provided. The shed-forming members 5, 6 form parts of arms 50 and 60, respectively, which are pivotally mounted on pins 51 and 61 (Fig. 24), respectively and interconnected by a pin and slot device 52. The arm 60 is provided with a lateral extension 62, and a pin on said extension 62 engages a groove 63 in the side of a disc which is secured to a shaft 19. The groove 63 is circular but disposed eccentrically in relation to the shaft 19. The common drive of the warp let off is effected by means known in themselves and not illustrated in the drawing.

On two rails 7, 8, which may be formed of tubes, the weft inserting members consisting of the weft-thread guide 9 and the members 10a and 10b are provided for each weaving position. The members 10a and 10b are parts of weft-thread inserting arms 10, each of which is arranged between two neighbouring weaving positions in such a way that it can insert the weft thread alternately into two neighbouring fabric bands. On the other hand, the first and last inserting arms 10 have only members 10a or 10b, since these insert weft threads only into a fabric band either at the left or at the right.

The weft thread 3 runs from the bobbin 4 first through a guide 13, Figs. 1 and 2, and then through a small tube 9a of the weft thread guide 9 to the inserting arm 10.

The rails 7, 8 are pivotally connected with rods 71 and 81, respectively, which are pivotally mounted on shafts 72 and 82, respectively. The free end of these rods 72, 82 is provided with a pin engaging a peripheral groove 73, 83, respectively, in a drum 74, 84, respectively, and these drums are secured to the shaft 19.

For beating-up the weft thread, two reeds 11 and 12 are used, which are arranged on opposite sides of the weaving plane, in such a way that one of them, for instance 12 is guided into the weaving shed from the rear (by "rear" is meant the position of the warp beam 16') in order to contact the already inserted weft thread and beat it downwards on to the finished fabric, whilst the reed 11 working in front of the shed is drawn back during that time and is brought into the position that enables it to enter the shed over the next weft thread, Figs. 1 and 2. The reeds work in such a way that they enter alternately horizontally into the weaving shed, beat the weft thread vertically towards the fabric, withdraw again horizontally out of the shed and rise again into the initial position.

The reeds execute very rapid movements, since they must beat the weft thread on to the fabric as much as possible before the crossing of the warp threads or the changing of the shed. Further they must be guided very accurately in order that they always enter between the same warp threads. In order to attain this, i. e. rapid movements and reliable weaving without vibration, a device has been created which guides the reeds very accurately and reliably. For this purpose the reeds are mounted on light frames. Each of these frames rests on each side on a ball which runs in a groove and serves as sliding and rotating point for the horizontal and vertical movement of the frame and/or reed. In order to give this frame a reliable guiding, it has been extended towards the rear and on each of these extensions to the left and to the right a surface has been mounted which in its turn presses against a second surface—mounted on the machine. In order that friction may be as slight as possible, a ball is laid between the fixed surface and the moving surface of the frame. Through this arrangement the frame is guided on the one hand between fixed and sliding surfaces also by means of balls, being held by springs against the guiding and control members.

Fig. 19 shows a side view of the device for the front reed 11. The frame 15 slides forwards and backwards on balls 18 which are disposed between two grooves 16 and 17, these balls serving at the same time as pivot point for the vertical motion. The reciprocating motion is controlled by the cam I which is driven by the shaft 19; the reciprocating motion is controlled through the lever 20 which is carried on a fixed pivot 21 and is in contact with the cam through the roller 22, whilst at the other end it is connected to the frame through the lever 23. The vertical motion is controlled by the cam II; through the small lever 25, with which the frame is rigidly connected. Said lever 25 rests through the roller 24 on the cam and is moved by this upwards and downwards around the pivot point of the ball 18. On the extension of the frame 15a a lateral guide 26 is provided, which presses on a rigid surface of the machine through the ball 27. The tension spring 28 presses the frame against the cams.

Figs. 20 and 23 show in a similar way the frame for the rear reed in two different positions. This frame is smaller and is therefore supported between the larger frame for the front reed. Again the frame has an extension to the rear with lateral guiding and is controlled by the cams III and IV in the same way as the above described frame for the front weft thread. Fig. 21 is a view from above of the bearing of the two reeds 11 and 12 with the frames. Here the rear guides on the machine frame M by means of the running surfaces and balls 26, 26a, 43 and 43a can be clearly seen.

By the horizontal movement of the rails and thereby of the weft inserting means, the weft thread does not always lie at the same height for the beating. If for instance the reed will act on the first part of the weft thread loop, it must penetrate into the shed under the upper part of the loop, i. e. not at the same height as if it would act on the weft thread which comes directly out of the weft guide 9. The reeds therefore make the following movements, once low round the first part of the thread loop to be acted on, Fig. 11 II, once high penetrating above the second part of the thread loop, Fig. 12 III, and once again high, in order to act on the simply inserted weft thread from the thread guide 9, Fig. 13 III.

Fig. 3 corresponds to Fig. 1 seen from the front. The two weft-inserting means 9 and 10 are positioned between the two fabric strips. The weft-thread guide 9 is passed between the shed-forming means 5 and 6 from the left to right through the shed open up to the back rest 13. While the reed 11 beats down the weft thread, the shed crosses and one part of the arm 10, namely the part 10a, enters into the shed. This part 10a, or better expressed the thread layer, has laid a loop 14 into the crossed shed, the first side of the loop being held by the reed 12 as soon as the weft-thread layer 10a has reached the outermost left end position (see Fig. 4 and Fig. 2). Then the thread layer 10a goes back into the initial position shown in Fig. 5. During this movement the reed 11 has been raised into the position ready for the next beating of the weft thread. As soon as the thread layer 10a has left the shed, the reed 11 enters the shed whilst the reed 12 withdraws and lays itself on the second half of the loop 14, Figs. 5 and 6. In Fig. 6 it can be seen how reed 11 has brought the weft thread against the fabric.

During the beating movement the shed is changed, i. e. the crossed shed (Fig. 2) is opened out; the sides 5 and 6 are drawn apart. The shed is now opened, Figs. 4 and 7, i. e. the two warp thread systems 1 and 2 are completely separated from the upper guide 13 (back beam) to the beating position, so that the weft thread guide 9 can insert the weft thread by a lateral movement of the rails 7, Figs. 1 and 3, from the right to the left side.

As soon as the inserted weft thread has been brought by the reed 12 on to the finished fabric, the shed is again crossed, and each inserting arm 10 can now enter the crossed shed from the left side from left to right, and that with the thread inserting means 10b. The reed 11 takes over the first half of the weft loop, the thread inserter 10b withdraws, after which reed 12 beats the second half of the loop. During this time the shed is crossed and the weft guide 9 can again return from left to right into the initial position Fig. 3. The thread guide therefore goes through between the two warp thread systems, once from left to right and once from right to left, whilst the inserting arm with its thread layer inserts once into the crossed shed in the left hand fabric strip, and once into the crossed shed in the right hand fabric strip.

By the bending of the thread layers 10a and 10b, somewhat more weft material is drawn each time from the bobbin than is afterwards inserted into the fabric. To compensate for this, a small lever is provided, over whose end the weft thread is led, and the lever produces compensating tension by means of an adjustable tension spring.

The tension of the weft thread may, however, also be adjusted by a positive acting device. In this case the weft thread runs from the bobbin 4 to the weft thread guide 9 between two eyes. Between these two eyes, a piece of felt is positively controlled, and this at a given moment exerts a slight pull on the weft thread or leaves it free.

While with the device here described, with one thread guide and two weft layers—each to the left and to the right of the strip—only one band can be woven; but several bands can be woven by fitting several thread guides and inserting arms; the device may also be carried out in such a way that, instead of one band, several bands may be woven with the same inserting arms, so that much room is saved and the machine elements are better utilised.

This happens preferably when narrow bands have to be woven. In order to attain this, the thread layer for the loops is formed in such a way that it has a catching device for the weft thread for each bandage to be woven. If for instance three bands have to be woven with the same arms, the weft thread layer is provided with three catching devices whilst the rails for the weft guide move three weft guides between two weft thread layers each having three catching devices. The shed building and weft beating segments have from band to band intermediate means in order to provide opportunity for the thread guides to come to lie between the bands. In this way the shed building needles can cross and therefore form the crossed shed, when a thread guide stands between the bands.

As an example of such a device, the following description is given of the weaving of two bands with two thread guides and two weft thread layers:

In place of a weft guide which is mounted between two weft thread layers, two weft thread guides 9a and 9b are fixed to the rails 8, Fig. 9. The shed-forming members are so constructed that the shed forming segments receive rows of needles for two bands, Figs. 9 and 14 to 18, as do also the guiding segments Figs. 12 and 13. The weft-thread guides are moved in such a way that the left-hand weft-thread guide 9a comes to lie once at the left of band A and the second weft-thread guide 9b comes to lie at the left of band B, i. e. between the two bands in Fig. 9. In this position the weft-thread arm 10, which is fixed to the rail 7 moves from left to right into the crossed shed Fig. 10. This arm has two thread engaging faces, one at the point and a second in the middle between the point and the inserting arm (see Fig. 9). When inserting into the left shed (band A) the first face by-passes the weft thread of the left weft-thread guide.

But as soon as the weft-thread layer has passed through a left shed, the thread engaging face at the point encounters the weft thread of the right-hand weft guide for band B; at the same time the face in the middle encounters the weft thread of the left-hand weft guide for band A, Fig. 10. The weft-thread layer now simultaneously lays two weft-thread loops into adjoining sheds for bands A and B (Fig. 11). The beating of the two weft loops against the fabric takes place as in the case of the device for one band, only that the beating device has two rows of needles instead of only one.

After the left weft-thread layer has returned into the initial position, Fig. 12, the shed changes and the two thread weft guides 9a and 9b are led from the left to the right side of the two sheds, whereby the single weft thread is inserted into each band, Fig. 13. When these two weft threads have been beaten up the shed is again crossed and now the right-hand weft-thread layer enters from the right into the two adjoined sheds. The thread engaging face at the point of the arm again goes past the first weft thread and comes on to the weft thread of the weft guide in the middle for band A, whilst the second face takes hold of the right weft thread for band B. In this manner two weft loops are now inserted from the right into the two adjoining sheds. After the usual beating up, the weft-thread layer returns into the initial position, the upper sides of the two weft-thread loops are again beaten up, the crossed shed is opened, and the two thread guides are again brought from left to right through the open shed.

In order that the weft threads may be caught or held with certainty by the thread engaging faces of the weft-thread layers, the faces and the position of the weft guides are staggered. As can be seen from the downward view in Fig. 14, the weft-thread layer at the left has a thread engaging face to the rear at the point (the front is where the weaver stands and the rear where the warp beam lies), and a second face in the middle of the thread layer towards the front; the right-hand weft-thread layer has the face on the point towards the front and the second face in the middle of the thread layer towards the rear. The left-hand weft-thread guide for band A is fixed to the rail 8 in such a way that it lies towards the front and the second weft-thread guide for the band B towards the rear.

The left-hand weft guide 9a or weft thread 3a consequently lies in the path of the front face, and the right-hand weft guide 9b or weft thread 3b in the path of the rear face, Fig. 14. If now the two weft guides are at the left of bands A and B, and the left-hand weft-thread layer moves from the left into the first shed, this layer passes the first weft thread, since the face is to the rear and the thread guide is arranged to the front. But as soon as the layer has reached the middle of the two bands the face at the top, which is at the rear, meets the weft thread 3b of the weft guide 9b. At this moment, Fig. 15, the weft-thread layer 9a with the face at the top consequently takes hold of the weft thread 3b, and the face in the middle which lies towards the front takes hold of the weft-thread 3a from the left-hand weft guide which also lies towards the front. Now the weft-thread layer 10a lays a loop from left to right into each of the bands A and B, Fig. 16. The two first loops are caught by the reed as already described, the thread layer returns into its initial position, Fig. 17, the second part of the thread loops is beaten up and during this operation the shed is crossed. The two weft guides move from left to right through the opened sheds, Fig. 18. After the two inserted weft threads have been beaten up in the bands A and B, the sheds are crossed and the thread layer now moves from right to left into the sheds. This time the thread layer 10b has the face at the top to the front and the face in the middle towards the rear, whilst the thread guide 9a always lies towards the front and the thread guide 9b always towards the rear. If therefore, thread layer 10b moves into the first shed from right to left, it passes the first weft thread, since it has the face towards the front and this weft guide lies toward the rear. In the middle between bands A and B it then moves on to the weft guide of the left-hand fabric and the face in the middle of the thread layer, which is directed to the rear, takes hold of the weft thread for band B, which is also lying towards the rear. At this moment the thread layer inserts, from right to left, two weft loops into the bands A and B. After the usual beating up and crossing of the shed, the thread guides return to their initial position and the operation can start again from the beginning.

What we claim is:

1. In a device for weaving fabric bands, by the use of two warp systems, means for inserting the weft thread into the warp including a weft-thread guide and weft-inserting members, means for forming the shed including two reeds for beating up the weft thread, and rails on which said weft-thread guides and said weft-inserting members are mounted, the said rails being separately movable in the direction transverse to the warp.

2. A device as claimed in claim 1 for the simultaneous weaving of two adjacent fabric bands, including a T-shaped weft-thread inserting arm with two inserting members arranged between each two adjacent weaving positions in such a manner that the said arm is adapted to insert the weft thread alternately into one of the two adjacent fabric bands.

3. A device as claimed in claim 1, in which the rails are arranged between the two warp thread systems, and sliding rollers mounted on ball bearings for supporting said rails.

4. A device as claimed in claim 1 for the simultaneous weaving of two adjacent fabric bands, including a T-shaped weft-thread inserting arm with two inserting members arranged between each two adjacent weaving positions in such a manner that the said arm is adapted to insert the weft thread alternately into one of the two adjacent fabric bands, the inserting arms being provided with thread engaging faces adapted to engage and hold several weft threads simultaneously and insert them into the shed.

5. A device as claimed in claim 1 for the simultaneous weaving of two adjacent fabric bands, including a T-shaped weft-thread inserting arm with two inserting members arranged between each two adjacent weaving positions in such a manner that the said arm is adapted to insert the weft thread alternately into one of the two adjacent fabric bands, the inserting arms being provided with thread engaging faces adapted to engage and hold several weft threads simultaneously and insert them into the shed, said weft thread engaging faces being arranged in steps and in staggered relation on said arms.

6. A device as claimed in claim 1, including two reeds supported opposite to each other, the said reeds being employed for beating up the weft thread, means for moving said reeds horizontally as well as vertically and for inserting the same into the shed at different heights, the height at which the reed penetrates into the shed at any time being determined by the position of the weft thread present in the shed, each reed being mounted on a frame, balls supporting said frame, and cams controlling the movement of said frame.

7. In a device for weaving fabric bands by the use of two warp systems, means for inserting the weft-thread into the warp including a weft-thread guide and weft-inserting members, means for forming the shed including two reeds for beating up the weft thread, rails on which said weft-thread guides and said weft-inserting members are mounted, the said rails being separately movable in the direction transverse to the warp, said two reeds being supported opposite to each other, means for moving said reeds horizontally as well as vertically and for inserting the same into the shed at different heights, the height at which the reed penetrates into the shed at any time being determined by the position of the weft-thread present in the shed, each reed being mounted on a fame, balls supporting said frame, cams controlling the movement of said frame, and said balls serving as running surface for the horizontal movement and simultaneously at point of rotation for the vertical movement of the frame.

8. In a device for weaving fabric bands by the use of two warp systems, means for inserting the weft-thread into the warp including a weft-thread guide and weft-inserting members, means for forming the shed including two reeds for beating up the weft thread, rails on which said weft-thread guides and said weft-inserting members are mounted, the said rails being separately movable in the direction transverse to the warp, said two reeds being supported opposite to each other, means for moving said reeds horizontally as well as vertically and for inserting the same into the shed at different heights, the height at which the reed penetrates into the shed at any time being determined by the position of the weft-thread present in the shed, each reed being mounted on a frame, balls supporting said frame, cams controlling the movement of said frame, and an extension on said frame provided with two sliding surfaces which press against two stationary surfaces and give the frame a positive guiding.

BERTRAND PAUL VOUMARD.
WALTHER HENRI NICOLET.

References Cited in the file of this patent

UNITED STATES PATENTS

| Number | Name | Date |
|---|---|---|
| 1,764,576 | Nicolet | June 17, 1930 |
| 1,764,577 | Nicolet | June 17, 1930 |
| 2,055,553 | Nicolet | Sept. 29, 1936 |
| 2,085,273 | Repass | June 29, 1937 |
| 2,142,615 | Nicolet | Jan. 3, 1939 |